Nov. 20, 1962 L. DEVOL 3,064,391
METHOD OF MAKING AN ANISOTROPIC
CONDUCTING TARGET PLATE
Filed Aug. 7, 1959
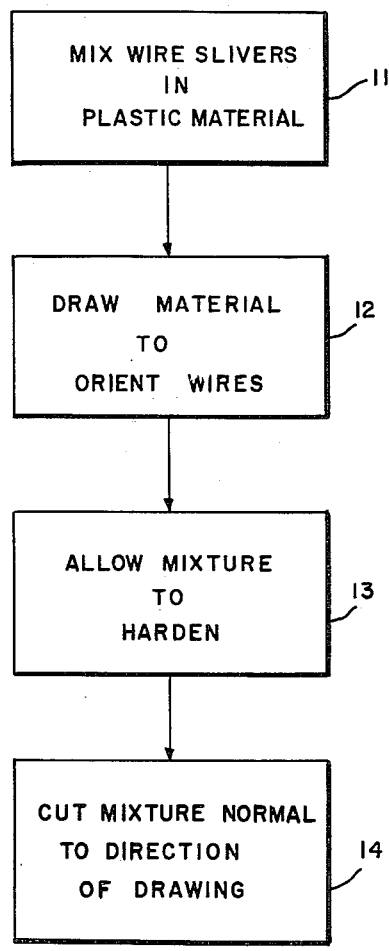
INVENTOR.
LEE DEVOL
BY
ATTORNEY
AGENT

3,064,391
METHOD OF MAKING AN ANISOTROPIC CONDUCTING TARGET PLATE
Lee Devol, Dayton, Ohio, assignor to the United States of America as represented by the Secretary of the Air Force
Filed Aug. 7, 1959, Ser. No. 832,417
2 Claims. (Cl. 65—45)
(Granted under Title 35, U.S. Code (1952), sec. 266)

The invention described herein may be manufactured and used by or for the United States Government for governmental purposes without payment to me of any royalty thereon.

This invention relates to a method for making anisotropically conducting target plates for use in optical amplifying television type pick-up tubes.

One object of the invention is to provide a method for making anisotropically conducting plates which is much simpler than prior art methods and which makes it unnecessary to use an electrostatic or an electromagnetic field for orienting the conducting elements.

This and other objects will be more fully understood from the following detailed description. The single FIGURE of the drawing shows a flow sheet for the method of the invention.

Certain cathode ray tubes use targets which have a great number of insulated conducting elements passing through the target. In constructing some of these targets various methods have been used to orient the conducting elements to cause them to pass through the target. This invention provides a simplified method for constructing such targets.

According to this invention long slender conducting wires of a material such as platinum or constanan slivers are mixed with a fluid or plastic material such as molten glass. The diameter of the wires should be as small as possible and may be approximately .001 inch. These wires may have a length of approximately $\frac{1}{16}$ inch. The wires must be insulated from each other in the target, so for practical limits the plastic material, when round wire is used, would not amount to less than about 50 percent of the total mixture by volume. It might be possible, however, to use less plastic when wires with other shapes are used. After the mixture cools to the proper drawing temperature, it is drawn to orient all of the wire elements substantially parallel to a line in the direction of drawing. Standard glass drawing procedures may be used for drawing the mixture. It is obvious that materials could be used which harden by means other than cooling, such as by drying, or by chemical treatment.

After the mixture is drawn, it is allowed to finish hardening. The mixture is then cut, perpendicular to the direction of drawing, into slices of the desired thickness. Usually the slices should be made as thin as possible which may, for example, be 0.030 inch for targets of $\frac{1}{2}$ inch in diameter.

The material may be cut by means of an abrasive wheel, whose composition depends upon the materials used for the target. A bonded diamond wheel may be used for cutting mixtures of metal conducting filaments in glass. The steps of the method are illustrated in blocks 11, 12, 13 and 14 of the drawing.

After cutting, the target may be treated to provide the desired properties, such as electron emission of photosensitivity.

There is thus provided a simplified method for producing anisotropically conducting target plates for use in optical amplifying television type pick-up tubes.

While certain examples for the wire and plastic material have been given, it is obvious that a large number of materials might be used, the only limitation being that the wire does not dissolve too rapidly in the fluid or plastic material.

I claim:

1. The method of making an anisotropic conducting target plate comprising; mixing a quantity of long slender conducting wires approximately .001 inch in diameter and $\frac{1}{16}$ inch in length in a hardenable plastic material while the latter is in fluid condition, drawing the material with the wires mixed therein to orient the wires along parallel lines, allowing the drawn material to harden and cutting the so hardened drawn material normal to the longitudinal axis of the drawn material into slices of desired thickness.

2. The method of making an anisotropic conducting target plate comprising; mixing a quantity of platinum wire slivers into molten glass, cooling the glass to drawing temperature, drawing the material to orient the wire slivers along parallel lines, allowing the mixture to harden and cutting the mixture normal to the direction of drawing into slices of desired thickness with a diamond bonded abrasive wheel.

References Cited in the file of this patent

UNITED STATES PATENTS

| | | |
|---|---|---|
| 220,907 | Arbogast | Oct. 28, 1879 |
| 2,189,340 | Donal | Feb. 6, 1940 |
| 2,287,598 | Brown | June 23, 1942 |
| 2,577,213 | Slayter et al. | Dec. 4, 1951 |
| 2,608,722 | Stuetzer | Sept. 2, 1952 |
| 2,619,438 | Varian et al. | Nov. 25, 1952 |
| 2,752,731 | Altosaar | July 3, 1956 |
| 2,947,027 | Slayter | Aug. 2, 1960 |

FOREIGN PATENTS

| | | |
|---|---|---|
| 160,152 | Great Britain | Dec. 22, 1921 |